(12) United States Patent
Tran (10) Patent No.: US 8,294,621 B2
(45) Date of Patent: Oct. 23, 2012

(54) WIDEBAND ANTENNA FOR PORTABLE COMPUTERS

(75) Inventor: Allen Minh-Triet Tran, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 713 days.

(21) Appl. No.: 12/413,294

(22) Filed: Mar. 27, 2009

(65) Prior Publication Data

US 2010/0245205 A1    Sep. 30, 2010

(51) Int. Cl.
*H01Q 1/24* (2006.01)
(52) U.S. Cl. ......................... 343/702; 343/876
(58) Field of Classification Search .................. 343/702, 343/876
See application file for complete search history.

(56) References Cited

U.S. PATENT DOCUMENTS

| | | | |
|---|---|---|---|
| 8,159,399 B2* | 4/2012 | Dorsey et al. ................. | 343/702 |
| 2006/0061512 A1 | 3/2006 | Asano et al. | |
| 2007/0164913 A1* | 7/2007 | Sakamoto et al. ............ | 343/702 |
| 2008/0106476 A1* | 5/2008 | Tran et al. .................... | 343/702 |

FOREIGN PATENT DOCUMENTS

| | | |
|---|---|---|
| EP | 1739785 A1 | 1/2007 |
| EP | 1962372 A1 | 8/2008 |
| EP | 1962372 A1 * | 8/2008 |

OTHER PUBLICATIONS

International Search Report and Written Opinion—PCT/US2010/028739, International Search Authority—European Patent Office—Jul. 21, 2010.

* cited by examiner

*Primary Examiner* — Jacob Y Choi
*Assistant Examiner* — Kyana R McCain
(74) *Attorney, Agent, or Firm* — Ramin Mobarhan (57) ABSTRACT

A wideband antenna, for use in portable computers incorporating at least one wireless communication device, with improved radiated antenna efficiency across a broad range of operating frequency bands with minimal additional physical size or cost, is described. In an exemplary embodiment, the wideband antenna is defined by at least a first and second housing, where a first metal structure in at least a first one of the at least a first and second housings is commonly connected to at least two antenna RF feed ports at a boundary of the at least a first and second housing. In a further exemplary embodiment, the device is a portable computer, and the first housing is an upper display housing, the second housing includes a wireless communication device with at least two RF signal paths to at least two antenna RF feed ports, and the second housing further includes a second metal structure commonly connected to at least two antenna RF feed ports of the wideband antenna.

38 Claims, 4 Drawing Sheets

WIDEBAND ANTENNA FOR PORTABLE COMPUTERS

TECHNICAL FIELD

The present disclosure relates generally to radio frequency (RF) antennas, and more specifically to wideband antennas for portable computers and like wireless devices.

BACKGROUND

Many portable computers (laptop, notebook, netbook and the like) incorporate wireless communication devices that operate in more than one frequency band and more than one operating mode. Some examples of operating modes include GSM, CDMA, WCDMA, LTE, EVDO—each in multiple frequency bands (CDMA450, US cellular CDMA/GSM, US PCS CDMA/GSM/WCDMA/LTE/EVDO, IMT CDMA/WCDMA/LTE, GSM900, DCS), short range communication links (Bluetooth, UWB), broadcast media reception (MediaFLO, DVB-H), high speed internet access (UMB, HSPA, 802.11a/b/g/n, EVDO), and position location technologies (GPS, Galileo). Therefore, with each of these modes in a wireless communication device embedded within a portable computer, the number of radios and frequency bands is incrementally increased. Furthermore, the complexity and design challenges for a wideband antenna supporting each frequency band as well as potentially multiple wideband antennas operating simultaneously (for receive and/or transmit diversity) may increase significantly. The number of radio frequency connections or cables between the wideband antennas and associated wireless communication device(s) embedded within the portable computer may also be a significant cost and design challenge.

One traditional solution for a wideband antenna is to combine multiple single-band antennas in parallel. The main disadvantage of this design technique is the large size required to accommodate multiple antennas. Another common solution for a wideband antenna is to manipulate the multiple resonant frequencies of a single antenna. The main drawback of this design technique is that the operating frequency bands must be close in frequency to the resonant harmonic frequencies of the antenna structure. Another common solution for a wideband antenna is to design a complex folded 2-d or 3-d structure that resonates in multiple frequency bands. Controlling the wideband antenna input impedance as well as enhancing the wideband antenna radiation efficiency (across a wide range of operative frequency bands) is restricted by the geometry of the wideband antenna and a matching circuit between the wideband antenna and the radio signal paths(s) from the wireless communication device. Often when this design approach is taken, the geometry of the wideband antenna is very complex and the physical area/volume of the wideband antenna increases.

With the limitations on designing wideband antennas with high antenna radiation efficiency and associated matching circuits, another solution is utilizing multiple antenna elements to cover multiple operative frequency bands. In a particular application, a wireless communication device embedded within a portable computer may include three frequency bands—US PCS, GPS, and Bluetooth. In this instance, separate radios may utilize one antenna for each operative frequency band (each antenna operates in a single radio frequency band). However, separate antennas may be required to allow simultaneous operation of a wide-area network link (such as CDMA at US Cellular 800 MHz or US PCS 1900 MHz) along with position location (GPS at 1.575 GHz) and wireless audio interface to a headset (Bluetooth at 2.4 GHz). In this particular design example, individual antennas must also be electrically isolated from each other to allow simultaneous operation.

Another design example may include 802.11n, where multiple (2, 3, or 4 normally) wideband antennas may operate in the same frequency at the same time to achieve higher data throughput. The isolation (coupling) required between wideband antennas in 802.11n is less than is required for multi-mode operation (CDMA, GPS, Bluetooth for example). Unfortunately in both examples, incorporating multiple antennas is significant design challenge and potential impacts include the additional area/volume and the additional cost of multiple (single-band or wideband) antenna elements.

There is a need for a wideband antenna with improved radiation efficiency across a broad range of operative frequencies for wireless communication devices embedded within portable computers. There is also a need for multiple wideband antennas within portable computers to allow simultaneous operation in one or more frequency bands.

To facilitate understanding, identical reference numerals have been used where possible to designate identical elements that are common to the figures, except that suffixes may be added, when appropriate, to differentiate such elements. The images in the drawings are simplified for illustrative purposes and are not necessarily depicted to scale.

The appended drawings illustrate exemplary configurations of the disclosure and, as such, should not be considered as limiting the scope of the disclosure that may admit to other equally effective configurations. Correspondingly, it has been contemplated that features of some configurations may be beneficially incorporated in other configurations without further recitation.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

The device described herein may be used for various wideband antenna designs including, but not limited to wireless communication devices for cellular, PCS, and IMT frequency bands and air-interfaces such as CDMA, TDMA, FDMA, OFDMA, and SC-FDMA. In addition to cellular, PCS or IMT network standards and frequency bands, this device may be used for local-area or personal-area network standards, WLAN, Bluetooth, & ultra-wideband (UWB).

Figure 1:
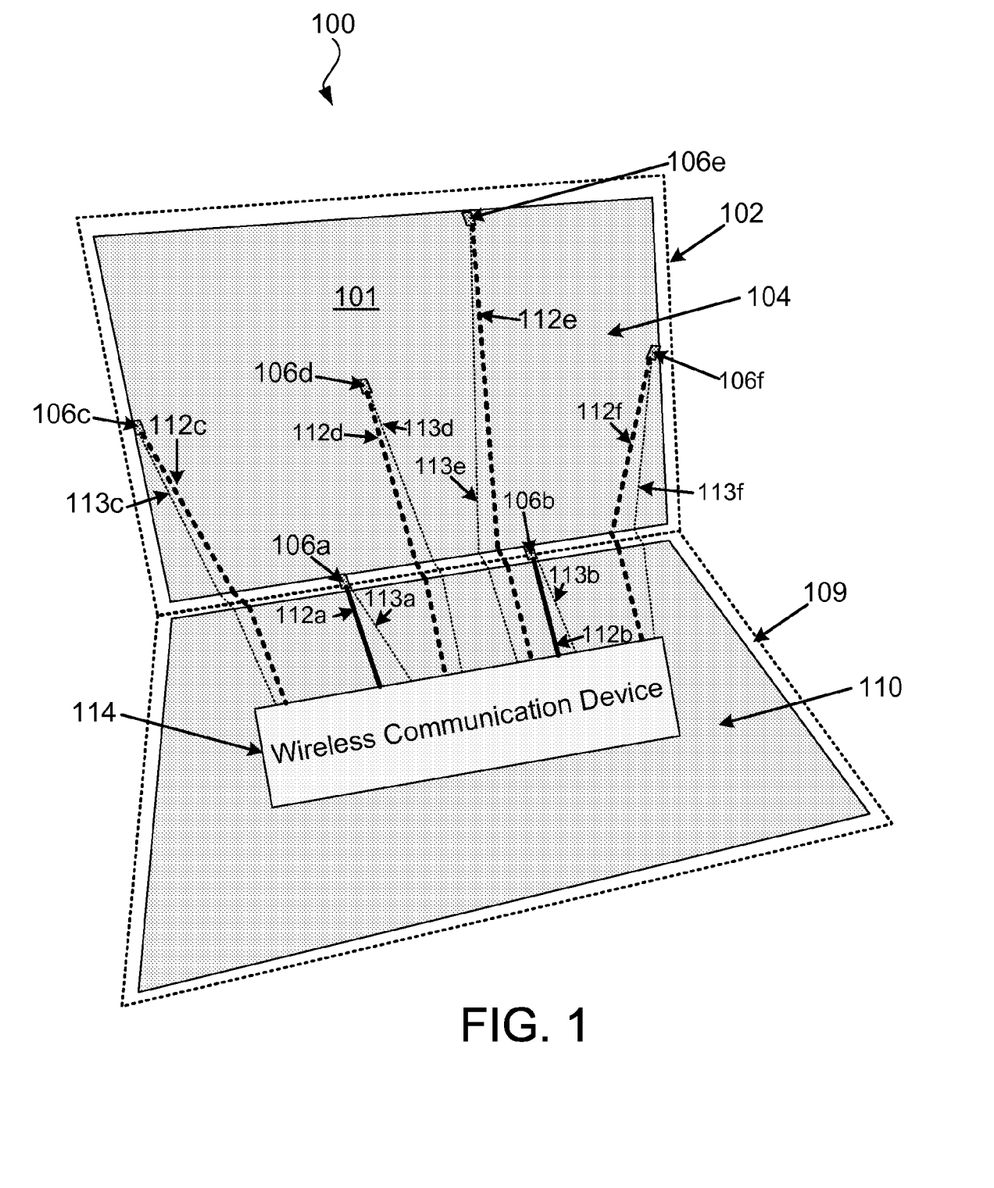
FIG. 1 shows a diagram of a wideband antenna for use in a portable computer with an embedded wireless communication device utilizing at least two radio frequency (RF) feed ports.

FIG. 1 shows a diagram of a wideband antenna for use in a portable computer with an embedded wireless communication device utilizing at least two radio frequency (RF) feed ports in accordance with an exemplary embodiment. A portable computer 100 and wideband antenna 101 are split between a first housing (upper display housing 102) and a second housing (lower main housing 109). Within upper display housing 102 is a first metal structure 104. First metal structure 104 may be a metal plane layer within a circuit board behind the display of portable computer 100 or a metal frame or plate in the same physical location. The physical shape of first metal structure 104 may be altered for different portable computer 100 configurations or operating frequency bands.

Within lower main housing 109 is a second metal structure 110. Second metal structure 110 may be a metal plane layer within the main circuit board of portable computer 100. Wireless communication device 114 is located on the surface of the main circuit board.

In other exemplary embodiments, first metal structure 104 and/or second metal structure 110 may be composed of metallization (metal plating or copper tape) on the surfaces of upper display housing 102 and/or lower main housing 109. Other possible exemplary embodiments for first metal structure 104 and/or second metal structure 110 include stamped or extruded metal parts embedded within upper display housing 102 and/or lower main housing 109. In further exemplary embodiments, upper display housing 102 and/or lower main housing 109 may be composed of metal shapes (selectively or entirely) to form first metal structure 104 and second metal structure 110.

In an exemplary embodiment, the electrical size of first metal structure 104 and second metal structure 110 have physical dimensions greater than $\lambda/4$, where $\lambda$ is equal to the lowest operating frequency wavelength of wideband antenna 101. The electrical and physical size of first metal structure 104 and second metal structure 110 exhibit low electrical loss, very wide operating frequency range (bandwidth), and function as a fat-dipole antenna.

In one exemplary embodiment, wireless communication device 114 drives two radio connections that operate independently in one or more radio frequency (RF) operating bands. One of the radios is routed through first RF signal path 112a to a first antenna RF feed port 106a and the other radio is routed through second RF signal path 112a to a second antenna RF feed port 106b. First RF signal path 112a and second RF signal path 112b may be routed as separate conductors composed of flexible coax cables between wireless communication device 114 and the first antenna RF feed port 106a and the second antenna RF feed port 106b. In other exemplary embodiments, first RF signal path 112a and second RF signal path 112b may be routed as signal/ground pairs between wireless communication device 114 and first antenna RF feed port 106a and second antenna RF feed port 106b on a layer of the main circuit board.

First antenna RF feed port 106a and second antenna RF feed port 106b may be composed of a flexible membrane including a metal conductor or transmission line to connect first RF signal path 112a and/or second RF signal path 112b at a selected point on any edge or anywhere on the surface of first metal structure 104. First antenna RF feed port 106a and second antenna RF feed port 106b may also be composed of a wire, cable, electrical waveguide, or equivalent electrical conductor suitable for connecting a corresponding RF signal path to wideband antenna 101.

Shown as dotted lines in FIG. 1, first antenna RF feed port tuning value 113a and second antenna RF feed port tuning value 113b may adjust or tune first optional antenna matching circuit 107a (shown in more detail in FIG. 2) and second optional antenna matching circuit 107b (shown in more detail in FIG. 3) if required for particular operating frequency bands.

In other exemplary embodiments, wireless communication device 114 may drive only one antenna RF feed port, or more than two antenna RF feed ports, depending on the number of simultaneous operating bands and modes supported. The number of antenna radio frequency feed ports may match the number of simultaneous RF signal paths supported by wireless communication device 114.

In further exemplary embodiments, any combination of any number of RF signal paths (shown in FIG. 1 as first RF signal path 112a, second RF signal path 112b, third RF signal path 112c, fourth RF signal path 112d, fifth RF signal path 112e, and/or sixth RF signal path 112f) and corresponding antenna RF feed ports (shown in FIG. 1 as first antenna RF feed port 106a, second antenna RF feed port 106b, third antenna RF feed port 106c, fourth antenna RF feed port 106d, fifth antenna RF feed port 106e, and/or sixth antenna RF feed port 1060 may also be located on any edge of first metal structure 104. Three possible locations are shown as a left edge at third antenna RF feed port 106c, a top edge at fifth antenna RF feed port 106e, and a right edge at sixth antenna RF feed port 106f in FIG. 1. In another exemplary embodiment, another possible location may be anywhere on the surface of first metal structure 104 shown at fourth antenna RF feed port 106d in FIG. 1. Although not shown in FIG. 1, antenna RF feed ports may also be located on second metal structure 110 in a similar fashion. In other exemplary embodiments, first metal structure 104 may be considered as an antenna element and the second metal structure 110 may be considered as a reference ground plane.

In exemplary embodiments, wireless communication device 114 may instead be located on top of first metal structure 104 if first metal structure 104 is a layer of a circuit board behind the portable computer 100 display (not shown in FIG. 1). In further exemplary embodiments, wireless communication device 114 may be split into multiple devices for different operating frequency bands and/or operating modes. Wireless communication device 114 may also multiplex more radio connections (M connections) to fewer RF signal paths (N paths) if a M×N multi-throw transfer switch is added between (N) antenna RF feed ports and wireless communication device 114 (M) radio connections. Antenna RF feed port tuning values 113a-113f may also be removed if not required and antenna matching circuits may also not be needed depending on the particular operating frequency bands of antenna RF feed ports 106a-106f.

Figure 2:
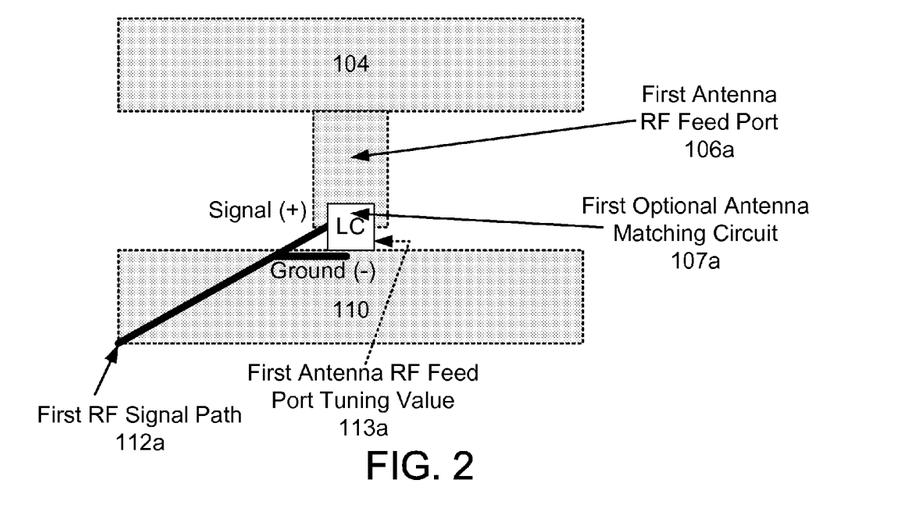
FIG. 2 shows a diagram of a first antenna RF feed port of the wideband antenna of FIG. 1 in an expanded view.

FIG. 2 shows a diagram of the first antenna RF feed port of the wideband antenna of FIG. 1 in an expanded view in accordance with an exemplary embodiment. First antenna RF feed port 106a is located at a boundary between upper display housing 102 and lower main housing 109 and connects first metal structure 104 to first RF signal path 112a. First RF signal path 112a is a conducting element and may be routed on or in second metal structure 110 utilizing a metal trace on a layer of the main circuit board or a flexible membrane, or through a coaxial cable (shown as a black line) where appropriate. First antenna RF feed port 106a consists of a metal trace (transmission line) printed on a flexible membrane or the like to provide a signal connection between first RF signal path 112a (positive signal) and first metal structure 104 within upper display housing 102 (shown in FIG. 1). The negative signal (−symbol) connection on second metal structure 110 is connected to a corresponding ground connection from first RF signal path 112a.

In exemplary embodiments, first antenna RF feed port 106a may also be a wire or the like as discussed in reference to FIG. 1. First antenna RF feed port 106a may be positioned at a first location along the boundary between first metal structure 104 and second metal structure 110. First antenna RF feed port 106a may be connected to first metal structure 104 or 110 along any edge or anywhere on the surface of either first metal structure 104 or 110.

A first optional antenna matching circuit 107a may be inserted in series or shunt with first RF signal path 112a (positive signal) to alter first antenna RF feed port 106a return loss in operating frequency bands. This is also graphically depicted in FIGS. 4-5. First optional antenna matching circuit 107a may be implemented in a variety of circuit topologies and may include inductors, capacitors, diodes, single-port multi-throw switches (SPnT) switches, or continuously variable capacitors, varactors, Ferro-electric capacitors, analog MEM capacitors, digital logic and biasing circuits but perform the same function.

In another exemplary embodiment, first optional antenna matching circuit 107a may include one or more tunable elements. Wireless communication device 114 (of FIG. 1) can be configured to send an analog control voltage signal (first antenna RF feed port tuning value 113a). First antenna RF feed port tuning value 113a may be the output of a digital to analog converter within wireless communication device 114 to discretely adjust continuously variable capacitors, variable varactors, Ferro-electric capacitors, or analog MEM capacitors in a known manner.

In another exemplary embodiment, first antenna RF feed port tuning value 113a may be comprised of one or more digital control signals driven by wireless communication unit 114 to discretely adjust first optional antenna matching circuit 107a with switchable inductor (L), capacitor (C) or LC matching network(s), for different operating frequency bands.

Figure 3:
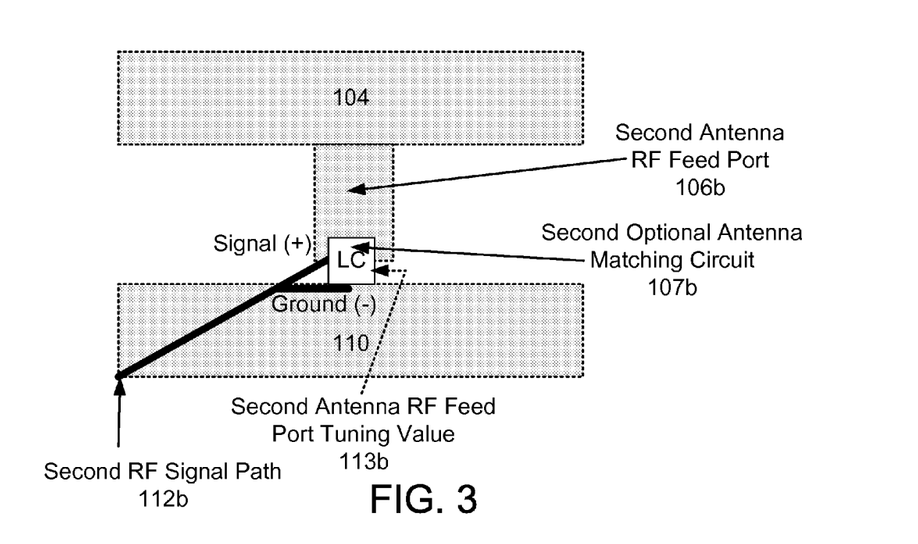
FIG. 3 shows a diagram of a second antenna RF feed port of the wideband antenna in FIG. 1 in an expanded view.

FIG. 3 shows a diagram of a second antenna RF feed port of the wideband antenna in FIG. 1 in an expanded view in accordance with a further exemplary embodiment. Second antenna RF feed port 106b is located at a boundary between upper display housing 102 and lower main housing 109 and connects first metal structure 104 to second RF signal path 112a. Second RF signal path 112a is a conductor and may be routed on or in second metal structure 110 utilizing a metal trace on a layer of the main circuit board or a flexible membrane, or through a coaxial cable (shown as a black line) where appropriate. Second antenna RF feed port 106b consists of a metal trace (transmission line) printed on a flexible membrane or the like to provide a signal connection between second RF signal path 112a (positive signal) and first metal structure 104 within upper display housing 102. The negative signal (−symbol) connection on second metal structure 110 is connected to a corresponding ground connection from second RF signal path 112a.

In other exemplary embodiments, second antenna RF feed port 106b may also be a wire or the like as discussed in reference to FIGS. 1-2. Second antenna RF feed port 106b may be positioned at a second location along the boundary between first metal structure 104 and second metal structure 110. Second antenna RF feed port 106b may also be connected to first metal structure 104 or 110 along any edge or anywhere on the surface of either first metal structure 104 or 110.

A second optional antenna matching circuit 107b may be inserted in series or shunt with second RF signal path 112a (positive signal) to alter second antenna RF feed port 106b return loss in operating frequency bands. This is also graphically depicted in FIGS. 4-5. Second optional antenna matching circuit 107b may be implemented in a variety of circuit topologies and may include inductors, capacitors, diodes, single-port multi-throw switches (SPnT) switches, continuously variable capacitors, varactors, Ferro-electric capacitors, analog MEM capacitors, digital logic and biasing circuits but perform the same function.

In one exemplary embodiment, second optional antenna matching circuit 107b may include one or more tunable elements. Wireless communication device 114 (of FIG. 1) can be configured to send an analog control voltage signal (second antenna RF feed port tuning value 113b). Second antenna RF feed port tuning value 113b may be the output of a digital to analog converter within wireless communication device 114 to discretely adjust continuously variable capacitors, variable varactors, Ferro-electric capacitors, or analog MEM capacitors in a known manner.

In another exemplary embodiment, second antenna RF feed port tuning value 113b may be comprised of one or more digital control signals driven by wireless communication unit 114 to discretely adjust second optional antenna matching circuit 107b with switchable inductor (L), capacitor (C) or LC matching network(s) for different operating frequency bands.

Figure 4:
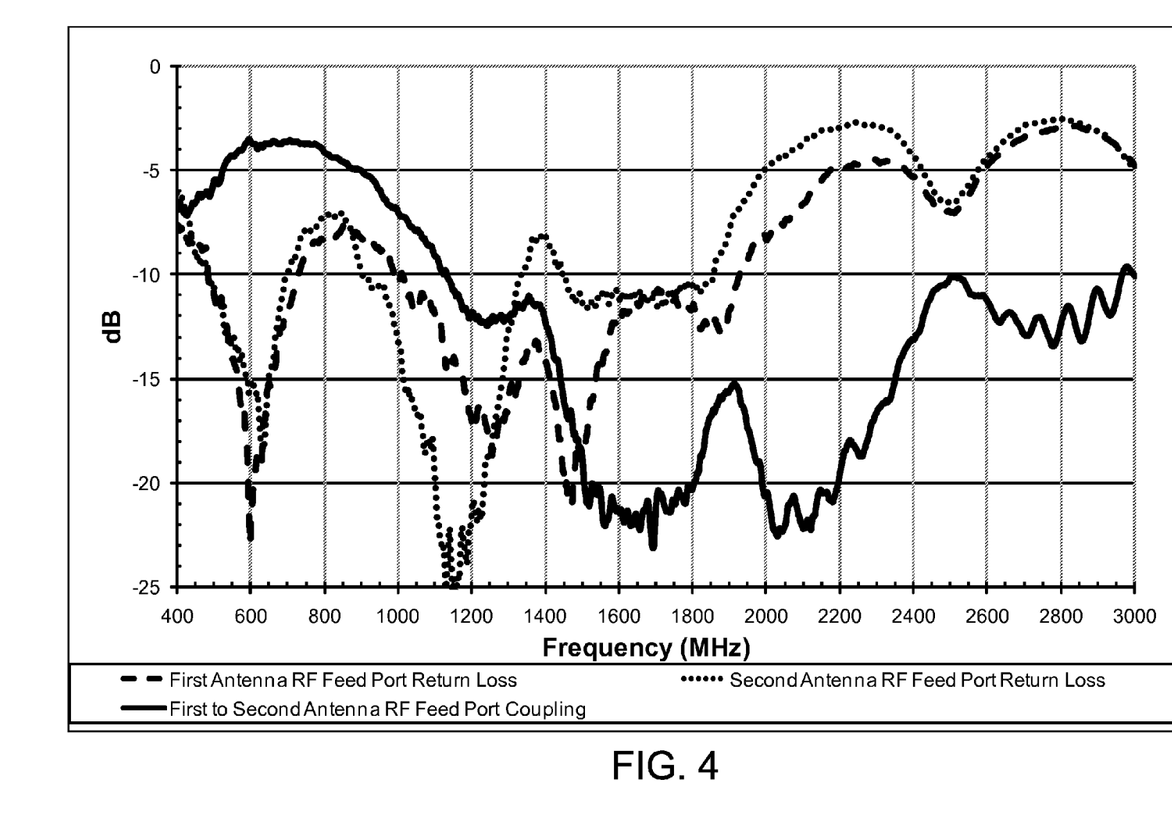
FIG. 4 graphically depicts antenna RF feed port return loss (400 to 3000 MHz) and antenna RF feed port coupling between the first and second antenna RF feed ports of the wideband antenna shown in FIGS. 1-3.

FIG. 4 graphically depicts antenna RF feed port return loss (400 to 3000 MHz) and antenna RF feed port coupling between the first and second antenna RF feed ports of the wideband antenna shown in FIGS. 1-3 in accordance with a preferred embodiment as shown. The waveforms represent wideband antenna 101 without first optional antenna matching circuit 107a and second optional antenna matching circuit 107b.

Antenna RF feed port return loss is a measure of the impedance matching at one or more measured radio frequencies. Impedance matching the corresponding RF signal path (112a or 112b, in this case 50 ohms) to the corresponding antenna RF feed port (first antenna RF feed port 106a or second antenna RF feed port 106b) is shown to improve antenna RF feed port return loss. Typically a target value antenna RF feed port return loss is −6 dB or lower for a high efficiency antenna design. In the case of first antenna RF feed port 106a, antenna RF feed port return loss may vary between −3 to −23 dB across a wideband of operating frequencies. In the case of second antenna RF feed port 106b, antenna RF feed port return loss may vary between −3 to −25 dB across a range of operating frequencies.

Given the variation in antenna RF feed port return loss shown in FIG. 4, a fixed value antenna matching circuit, across such a wide range of operating frequencies, would be difficult to design. However, a tunable or switchable antenna matching circuit could improve antenna RF feed port return loss above 2000 MHz if required for Bluetooth (2412-2.484

MHz) and WLAN (2412-2484 MHz or 4900-5800 MHz, not shown) for either first antenna RF feed port 106a or second antenna RF feed port 106b. Antenna matching circuits (first optional antenna matching circuit 107a and second optional antenna matching circuit 107b) would be located at the corresponding antenna RF feed ports shown previously in FIGS. 2-3. First antenna RF feed port tuning value 113a and second antenna RF feed port tuning value 113b may tune a corresponding antenna matching circuit to improve antenna RF feed port return loss across a range of operating frequency bands.

First to second antenna RF feed port coupling between first antenna RF feed port 106a and second antenna RF feed port 106b is depicted as a solid line in FIG. 4. As can be seen, first to second antenna RF feed port coupling is high at 600 MHz (approximately −3.5 dB), but improves significantly (drops in amplitude) above 1400 MHz. In an exemplary embodiment, the first and second antennas can be used simultaneously for most operating frequency bands without substantial interference between operating frequency bands. Feasible combinations may include but are not limited to US Cellular+GPS, US Cellular+US PCS, MediaFLO+IMT, etc. A tunable or switchable antenna matching circuit could reduce the first to second antenna RF feed port coupling between first antenna RF feed port 106a and second antenna RF feed port 106b by filtering RF energy outside the current operating frequency band for each antenna RF feed port. Antenna matching circuits (first optional antenna matching circuit 107a and second optional antenna matching circuit 107b) could be located at the corresponding antenna RF feed ports. In further exemplary embodiments, first antenna RF feed port tuning value 113a and second antenna RF feed port tuning value 113b may tune a corresponding antenna matching circuit to reduce first to second antenna RF feed port coupling in different operating frequency bands.

Figure 5:
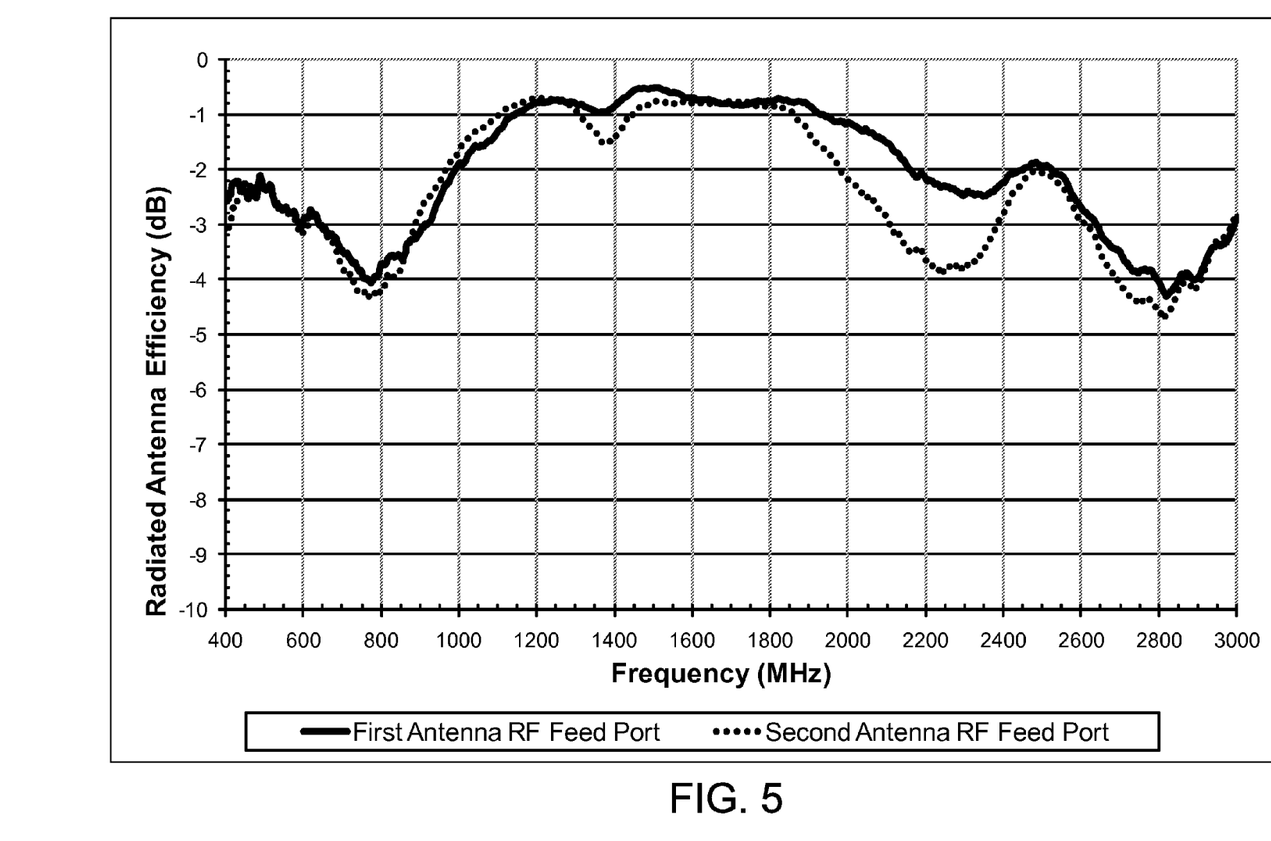
FIG. 5 graphically depicts radiated antenna efficiency (400 to 3000 MHz) for the first and second antenna RF feed ports of the wideband antenna shown in FIGS. 1-3.

FIG. 5 graphically depicts radiated antenna efficiency (400 to 3000 MHz) for the first and second antenna RF feed ports of the wideband antenna shown in FIGS. 1-3 in accordance with the exemplary embodiment. The waveforms represent wideband antenna 101 without first optional antenna matching circuit 107a and second optional antenna matching circuit 107b.

Radiated antenna efficiency is a measure of the total radiated power drop between an antenna RF feed port and free-space at one or more measured radio frequencies. For first antenna RF feed port 106a, radiated antenna efficiency varies between −0.5 to −4 dB across a wideband of operating frequencies. For second antenna RF feed port 106b, the radiated antenna efficiency varies between −0.75 to −4.6 dB across a wideband of operating frequencies and closely matches first antenna RF feed port 106a radiated antenna efficiency. As previously mentioned, as a practical matter, a fixed value antenna matching circuit, across such a wide range of operating frequencies would be difficult to design. However, a tunable or switchable antenna matching circuit could improve the radiated antenna efficiency above 2000 MHz if required.

The overall wideband radiated antenna efficiency performance is comparable to traditional embedded antennas without the additional cost (materials and cabling) as well as design complexity of tunable antennas. Antenna matching circuits (first optional antenna matching circuit 107a and second optional antenna matching circuit 107b in this instance) may be located at the corresponding antenna RF feed ports if required. In a further exemplary embodiment, first antenna RF feed port tuning value 113a and second antenna RF feed port tuning value 113b may tune a corresponding antenna matching circuit to improve the measured radiated antenna efficiency for first antenna RF feed port 106a and second antenna RF feed port 106b in operating frequency bands.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wideband antenna system comprising: a plurality of antennas configured to share first and second metal structures disposed in first and second housings, respectively, each antenna having an associated RF feed port that is physically disposed to extend from a position in the first metal structure to a position located at or in proximity of a boundary of the second metal structure; wherein the plurality of antennas comprises at least a first antenna having a first feed port on the second metal structure at a edge of the second metal structure between the first metal structure and the second metal structure and a second antenna having a second feed port on the second metal structure at an edge of the second metal structure between the first metal structure and the second metal structure at a distance from the first antenna and at least a third antenna having a third feed port at a boundary of the second metal structure; wherein the plurality of antennas are electrically disposed such that the first and second metal structures are configured to provide electrical isolation among the plurality of antennas.

2. The wideband antenna system of claim 1, wherein the maximum number of antennas of the plurality of antennas is a function of the physical dimensions of a portable wireless communication device in which the wideband antenna system is to be integrated into.

3. The wideband antenna system of claim 1, wherein the wideband antenna system is a wireless antenna system integrated in a portable wireless communication device of sufficient housing size to allow the plurality of antennas to be electrically isolated from one another in the same device.

4. The wideband antenna system of claim 1, wherein the boundary is defined by at least two edges and wherein each respective RF feed port extends up to or in proximity of a different one of the at least two edges of the boundary.

5. The wideband antenna system of claim 1, wherein the plurality of antennas operate at different frequencies.

6. The wideband antenna system of claim 1, wherein the plurality of antennas operate simultaneously to provide receive and/or transmit diversity.

7. The wideband antenna system of claim 1, wherein each RF feed port is a transmission line formed by printing a flexible membrane.

8. The wideband antenna system of claim 1, wherein each RF feed port is a flexible coaxial cable.

9. The wideband antenna system of claim 1, further comprising an antenna matching circuit coupled to each RF feed port.

10. The wideband antenna system of claim 9, wherein each antenna matching circuit includes a corresponding tunable element to impedance match the RF feed port to the desired operating frequency band for that antenna.

11. The wideband antenna system of claim 10, wherein each tunable element includes a continuously variable capacitor.

12. The wideband antenna system of claim 11, wherein at least one tunable element includes at least one single-port multi-throw switch (SPnT) with n positions and an array of n fixed passive elements.

13. The wideband antenna system of claim 12, wherein the tunable elements are formed on a single integrated circuit.

14. The wideband antenna system of claim 12, wherein at least one of the first and second housings includes a display and the corresponding metal structure is disposed underneath the display.

15. The wideband antenna system of claim 10, wherein at least one tunable element includes at least one single-port multi-throw switch (SPnT) with n positions and an array of n fixed passive elements.

16. The wideband antenna system of claim 15, wherein the array of n fixed passive elements include capacitors.

17. A wideband antenna system comprising: N antennas configured to share first and second metal structures disposed in first and second housings, respectively, each antenna having an associated one of N antenna RF feed ports, each physically disposed to extend from a position in the first metal structure to a position located at or in proximity of a boundary of the second metal structure; wherein the N antennas comprises at least a first antenna having a first feed port on the second metal structure at a edge of the second metal structure between the first metal structure and the second metal structure and a second antenna having a second feed port on the second metal structure at an edge of the second metal structure between the first metal structure and the second metal structure at a distance from the first antenna and at least a third antenna having a third feed port at a boundary of the second metal structure; wherein the N antennas are electrically disposed such that the first and second metal structures are configured to provide electrical isolation between the N antennas, the N antenna RF feed ports being collectively coupled to a single wireless communication device supporting M radio frequency signal paths through an N×M multi-throw transfer switch.

18. The wideband antenna system of claim 17, wherein N is a maximum number of antennas as determined by the housing size of a portable wireless communication device in which the wideband antenna system is to be integrated into.

19. The wideband antenna system of claim 17, wherein the wideband antenna system is a wireless antenna system integrated in a portable wireless communication device of sufficient housing size to allow the N antennas to be electrically isolated from one another.

20. The wideband antenna system of claim 17, wherein the boundary is defined by at least two edges and wherein at least two RF feed port extend up to or in proximity of a different one of the at least two edges of the boundary.

21. The wideband antenna system of claim 17, wherein the N antennas operate at different frequencies.

22. The wideband antenna system of claim 17, wherein the N antennas operate simultaneously to provide receive and/or transmit diversity.

23. The wideband antenna system of claim 17, wherein each RF feed port is a transmission line formed by printing a flexible membrane.

24. The wideband antenna system of claim 17, wherein each RF feed port is a flexible coaxial cable.

25. The wideband antenna system of claim 17, further comprising an antenna matching circuit coupled to each RF feed port.

26. A portable laptop comprising: N antennas configured to share first and second metal structures disposed in first and second housings, respectively, each antenna having an associated one of N antenna RF feed ports, each physically disposed to extend from a position in the first metal structure to a position located at or in proximity of a boundary of the second metal structure; wherein the N antennas comprises at least a first antenna having a first feed port on the second metal structure at a edge of the second metal structure between the first metal structure and the second metal structure and a second antenna having a second feed port on the second metal structure at an edge of the second metal structure between the first metal structure and the second metal structure at a distance from the first antenna and at least a third antenna having a third feed port at a boundary of the second metal structure; wherein the N antennas are electrically disposed such that the first and second metal structures are configured to provide electrical isolation between the N antennas, the N antenna RF feed ports being collectively coupled to a single wireless communication device supporting M radio frequency signal paths through an N×M multi-throw transfer switch.

27. The portable laptop of claim 26, wherein the maximum value of N is a function of the housing size of the portable laptop as well as the size and configuration of the metal structures disposed therein.

28. The portable laptop of claim 26, wherein the boundary is defined by at least two edges and wherein at least two RF feed port extend up to or in proximity of a different one of the at least two edges of the boundary.

29. The portable laptop of claim 26, wherein the N antennas operate at different frequencies.

30. The portable laptop of claim 26, wherein the N antennas operate simultaneously to provide receive and/or transmit diversity.

31. The portable laptop of claim 26, wherein each RF feed port is a transmission line formed by printing a flexible membrane.

32. The portable laptop of claim 26, wherein each RF feed port is a flexible coaxial cable.

33. The portable laptop of claim 26, further comprising an antenna matching circuit coupled to each RF feed port.

34. A wideband antenna system comprising: means for providing a plurality of RF feed ports physically configured to share first and second metal structures disposed in first and second housing; means for electrically isolating the plurality of RF feed ports so as to define a plurality of antennas electrically isolated from one another, wherein each associated RF feed port is physically disposed to extend from a position in the first metal structure to a position located at or in proximity of a boundary of the second metal structure and wherein at least two feed ports are disposed at an edge of the second metal structure between the first metal structure and the second metal structure and at least a third feed port is disposed at a boundary of the second metal structure.

35. The wideband antenna system of claim 34, wherein the maximum number of antennas of the plurality of antennas is a function of the physical dimensions of a portable wireless communication device in which the wideband antenna system is to be integrated into.

36. The wideband antenna system of claim 34, wherein the wideband antenna system is a wireless antenna system integrated in a portable wireless communication device of sufficient housing size to allow the plurality of antennas to be electrically isolated from one another in the same device.

37. The wideband antenna system of claim 34, wherein the boundary is defined by at least two edges and wherein each respective RF feed port extends up to or in proximity of a different one of the at least two edges of the boundary.

38. The wideband antenna system of claim 34, wherein the plurality of antennas operate simultaneously to provide receive and/or transmit diversity.

* * * * *